US011080299B2

(12) United States Patent
Stewart et al.

(10) Patent No.: US 11,080,299 B2
(45) Date of Patent: Aug. 3, 2021

(54) METHODS AND APPARATUS TO PARTITION A DATABASE

(71) Applicant: McAfee, LLC, Santa Clara, CA (US)

(72) Inventors: Brian Howard Stewart, Idaho Falls, ID (US); Brian Roland Rhees, Idaho Falls, ID (US); Seth D. Grover, Idaho Falls, ID (US)

(73) Assignee: McAfee, LLC, San Jose, CA (US)

( * ) Notice: Subject to any disclaimer, the term of this patent is extended or adjusted under 35 U.S.C. 154(b) by 257 days.

(21) Appl. No.: 16/050,712

(22) Filed: Jul. 31, 2018

(65) Prior Publication Data

US 2020/0042634 A1 Feb. 6, 2020

(51) Int. Cl.
*G06F 16/27* (2019.01)
*G06F 3/06* (2006.01)
*G06F 16/245* (2019.01)
*G06F 16/22* (2019.01)

(52) U.S. Cl.
CPC ........... *G06F 16/278* (2019.01); *G06F 3/062* (2013.01); *G06F 3/0644* (2013.01); *G06F 3/0689* (2013.01); *G06F 16/2282* (2019.01); *G06F 16/245* (2019.01)

(58) Field of Classification Search
CPC .. G06F 16/278; G06F 16/245; G06F 16/2282; G06F 3/0689; G06F 3/062; G06F 3/0644
See application file for complete search history.

(56) References Cited

U.S. PATENT DOCUMENTS

| 6,480,839 | B1   | 11/2002 | Whittington et al. |            |
|-----------|------|---------|--------------------|------------|
| 8,412,713 | B2   | 4/2013  | Stewart et al.     |            |
| 2006/0143383 | A1* | 6/2006 | Zohar ............... | G06F 12/0866 |
|           |      |         |                    | 711/118    |
| 2010/0198830 | A1 | 8/2010 | Stewart et al.     |            |
| 2011/0167239 | A1* | 7/2011 | Horn ............... | G06F 16/17 |
|           |      |         |                    | 711/171    |
| 2011/0196822 | A1* | 8/2011 | Zunger ............. | G06F 16/27 |
|           |      |         |                    | 707/609    |
| 2017/0024161 | A1* | 1/2017 | Katiyar ............ | G06F 3/0689 |
| 2017/0277747 | A1* | 9/2017 | Tremayne .......... | G06F 16/2425 |
| 2019/0005262 | A1* | 1/2019 | Surla .............. | H04L 9/0894 |
| 2020/0042538 | A1 | 2/2020 | Stewart et al.     |            |

OTHER PUBLICATIONS

United States Patent and Trademark Office, "Non-Final Office Action," issued in connection with U.S. Appl. No. 16/050,705, dated Dec. 16, 2020, 24 pages.

* cited by examiner

*Primary Examiner* — Cam Y T Truong
(74) *Attorney, Agent, or Firm* — Hanley, Flight & Zimmerman, LLC

(57) ABSTRACT

Methods, apparatus, systems, and articles of manufacture to partition a database are disclosed. An example apparatus includes a variant identifier to identify a variant of unstructured data included in a query. The variant identifier is to identify a size of the identified variant, the query including unstructured data to be written to a database. A partition manager is to select a partition into which data is to be written based on the size of the identified variant. A partition creator is to, in response to the selected partition not existing in the database, create the selected partition. A data writer to write the data to the selected partition.

17 Claims, 7 Drawing Sheets

|       | VARIANT | PARTITION | VARIANT SIZE |
|-------|---------|-----------|--------------|
| 291   | 0       | 0         | 2            |
| 292   | 1       | 1         | 8            |
| 293   | 2       | 2         | 32           |
| 294   | 3       | 3         | 64           |
| 295   | 4       | 3         | 64           |
| 296   | 5       | 4         | 256          |

METHODS AND APPARATUS TO PARTITION A DATABASE

FIELD OF THE DISCLOSURE

This disclosure relates generally to database structures, and, more particularly, to methods and apparatus to partition a database.

BACKGROUND

Databases are commonly used to store data in an organized format. In some cases, large amounts of data may be stored in such a database. Some database structures utilize partitions to organize larger volumes of data and improve performance when accessing those larger volumes of data.

BRIEF DESCRIPTION OF THE DRAWINGS

FIG. 2A is an example table that may be stored in the example variant-partition link datastore of FIG. 2.

The figures are not to scale. In general, the same reference numbers will be used throughout the drawing(s) and accompanying written description to refer to the same or like parts.

DETAILED DESCRIPTION

Databases are used to store data in an organized format. In some examples, large amounts of data may need to be stored. Databases may be used to store, for example, event data. Storing large amounts of data in a single table and/or file may result in performance issues when retrieving data from that table and/or file and/or when writing data to that table and/or file. To address this, database systems commonly divide data within a single database to enable the ease of automatic data management (partition roll-off/deletion), enable faster drill-down to relevant data, and enable a more efficient path to restoring data. Such data partitioning is particularly useful in security information and event management (SIEM) systems.

SIEM systems enable a combination of security information management and security event management, and provide for real-time analysis of security events/alerts generated by various hardware, systems, applications, etc. Such systems typically collect enormously large amounts of data (e.g., gigabytes of data per second). In such scenarios, efficiently organizing such data is important. NitroEDB is an example relational database management system (RDBMS) that enables the use of flexTables. FlexTables are datatables that allow for unstructured data to be stored in a structured database. FlexTables utilizes a variant ID to identify the particular variant of the unstructured data. For example, address data may have a number of different variants. For example, a first variant may include a street address, a six digit zip code, and a state; while a second variant may include the street address, a ten digit zip code, a city, a state, and a country. FlexTables enables both variants to be stored in a column of a table, even though the data is formatted differently.

Example approaches disclosed herein enable data partitioning based on a size of a variant of unstructured data. Such organization approaches enable greater control over how data is separated and thereby searched, maintained, and rebuilt.

Figure 1:
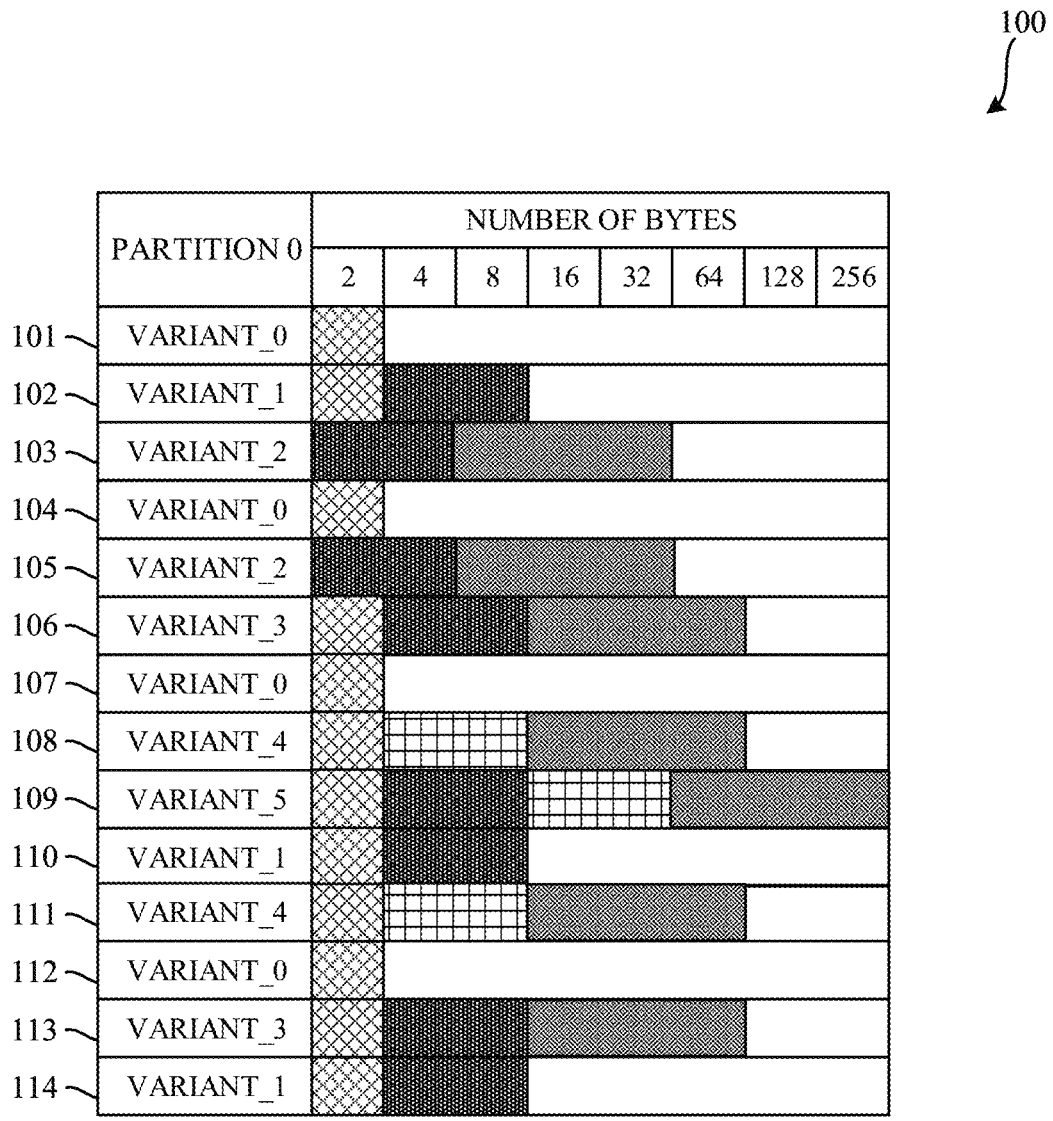
FIG. 1 is a block diagram illustrating an example partition storing data having different variants.

FIG. 1 is a diagram 100 illustrating an example partition that stores unstructured data. In the illustrated example of FIG. 1, data is stored in a single partition. The example partition of the illustrated example of FIG. 1 includes fourteen records 101, 102, 103, 104, 105, 106, 107, 108, 109, 110, 111, 112, 113, 114. However, any other number of records may additionally or alternatively be used.

In the illustrated example of FIG. 1, a first record 101 stores unstructured data having a first variant (e.g., VARIANT_0). A second record 102 stores unstructured data having a second variant (e.g., VARIANT_1). A third record 103 stores unstructured data having a third variant (e.g., VARIANT_2). A fourth record 104 stores unstructured data having the first variant (e.g., VARIANT_0). A fifth record 105 stores unstructured data having the third variant (e.g., VARIANT_2). A sixth record 106 stores unstructured data having a fourth variant (e.g., VARIANT_3). A seventh record 107 stores unstructured data having the first variant (e.g., VARIANT_0). An eighth record 108 stores unstructured data having a fifth variant (e.g., VARIANT_4). A ninth record 109 stores unstructured data having a sixth variant (e.g., VARIANT 5). A tenth record 110 stores unstructured data having the second variant (e.g., VARIANT_1). An eleventh record 111 stores unstructured data having the fifth variant (e.g., VARIANT_4). A twelfth record 112 stores unstructured data having the first variant (e.g., VARIANT_0). A thirteenth record 113 stores unstructured data having the fourth variant (e.g., VARIANT_3). A fourteenth record 114 stores unstructured data having the second variant (e.g., VARIANT_1).

In examples disclosed herein, the data is unstructured data having a format identified by its corresponding variant identifier. For example, the example first variant (e.g., VARIANT_0, see records 101, 104, 107, 112) stores two bytes of data, the second example variant (e.g., VARIANT_1, see records 102, 110, 114) stores eight bytes of data, the third example variant (e.g., VARIANT_2, see records 103, 105) stores thirty two bytes of data, the fourth example variant (e.g., VARIANT_3, see records 106, 113) stores sixty four bytes of data, the fifth example variant (e.g., VARIANT_4, see records 108, 111) stores sixty four bytes of data, and the sixth variant (e.g., VARIANT_5, see record 109) stores two hundred and fifty six bytes of data. Because the example data is unstructured, the data fields used to store that information must account for the largest variant (e.g., type, format, etc.) of such data. That is, while a first variant (e.g., the first record 101 of FIG. 1) stores two bytes of data, the sixth variant (e.g., the ninth record 109 of FIG. 1) may store two hundred and fifty-six bytes of data. To accommodate the sixth variant, the unstructured data field must allow at least two hundred and fifty-six bytes of data to be stored. Thus, when storing data using the first variant (e.g., two bytes of data), the additional two hundred and fifty-four bytes of data is unused (and is wasted space within the database). While such an approach improves performance, storage efficiency is reduced (e.g., there is some wasted storage space).

Figure 2:
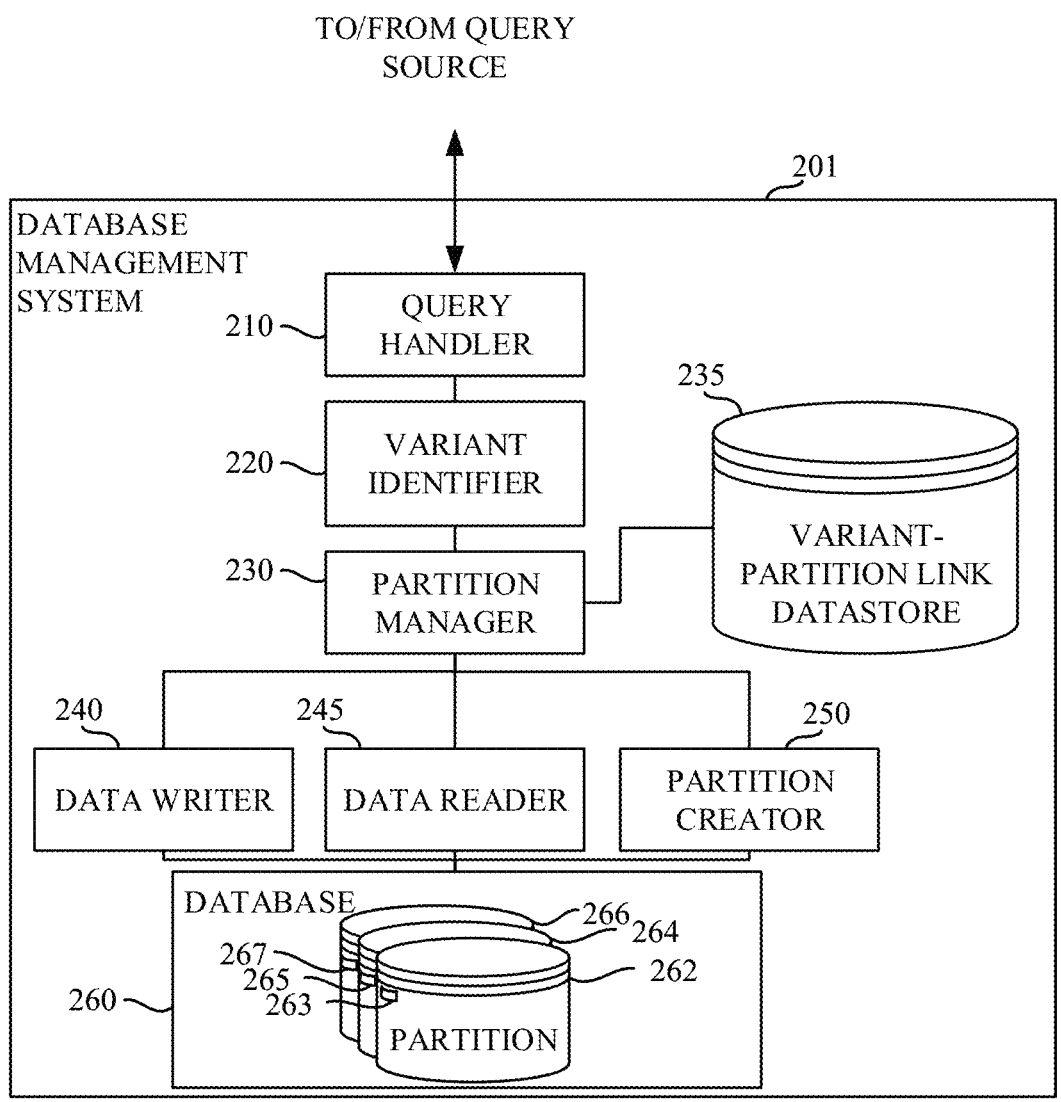
FIG. 2 is a block diagram of an example database system for efficiently partitioning a database.

FIG. 2 is a block diagram of an example database system 201 for efficiently partitioning a database. The example database system includes a query handler 210, a variant identifier 220, a partition manager 230, a variant-partition link datastore 235, a data writer 240, a data reader 245, a partition creator 250, and a database 260. The example query handler 210 receives a query (e.g., an instruction to read and/or write data to a database) from a query source. The example variant identifier 220 of the example database system 201 analyzes the received query to identify a variant associated with the query. In some examples, more than one variant may be identified. The example partition manager 230 then selects a corresponding partition(s) to be written to and/or read from based on variant-partition links stored in the variant-partition link datastore 235. In some examples, the partition (and/or the variant-partition link) may not yet exist, in which case the partition manager 230 may interact with the partition creator 250 to create the partition. The partition manager 230, using the example data writer 240 and/or the example data reader 245, then executes the query against the database 260 and a result is returned to the query source via the query handler 210.

In the illustrated example of FIG. 2, the example query handler 210 is implemented by a hardware logic circuit. However, any other type of circuitry may additionally or alternatively be used such as, for example, one or more analog or digital circuit(s), logic circuits, programmable processor(s), Application Specific Integrated Circuit(s) (ASIC(s)), Programmable Logic Device(s) (PLD(s)), Field Programmable Logic Device(s) (FPLD(s)), Digital Signal Processor(s) (DSP(s)), etc. The example query handler 210 of the illustrated example of FIG. 2, accesses queries to be executed against the database. In examples disclosed herein, a query includes data to be written and/or instructions on what data is to be read from a database. However, a query may include any other information such as a command that is to be executed against the database. In examples disclosed herein, the query handler provides a response to the query source. In some examples, the response may indicate that the query was executed successfully.

In the illustrated example of FIG. 2, the example variant identifier 220 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. the example variant identifier 220 of the illustrated example of FIG. 2, The example variant identifier 220 analyzes data to be written to and/or read from the database to determine a variant of the data to be written and/or read. In examples disclosed herein, the possible variants are identified at a time of configuration (and/or re-configuration) of the database by a database administrator. Such potential variants are identified to the variant identifier 220 and/or the partition manager 230 to enable the partitioning of the database along those dimensions. However, in some examples, the potential variants may be identified on the fly.

In examples disclosed herein, the example variant identifier 220 determines the variant based on the contents of the query received from the query source. However, in some examples, the example variant identifier 220 may identify the variant based on metadata associated with the query such as, for example, an indication of the variant used for the data, a source of the query (e.g., a first device may report data using a first variant whereas a second device may report data using a second variant different from the first variant), a time at which the query was received, etc.

In the illustrated example of FIG. 2, the example partition manager 230 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example partition manager 230 of the illustrated example of FIG. 2, the example partition manager 230 selects a partition(s) to which the data is to be written based on the dimensioning values identified by the variant identifier 220. In some examples, a single partition is identified. However, in some other examples, data may be received that is to be written to multiple partitions and, as a result, multiple partitions may be identified. The example partition manager 230 then determines whether the selected partition exists. If the selected partition does not exist, the example partition manager 230 instructs the example partition creator 250 to create the selected partition. The example partition creator 250 and/or the partition manager 230 stores the dimensioning values that were used in connection with the creation of the partition as an index (e.g., the index 263, 265, 267 of FIG. 2) so that the data stored in the partition can be more quickly identified at a later time.

The example variant-partition link datastore 235 of the illustrated example of FIG. 2 is implemented by any memory, storage device and/or storage disc for storing data such as, for example, flash memory, magnetic media, optical media, etc. Furthermore, the data stored in the example database 260 may be in any data format such as, for example, binary data, comma delimited data, tab delimited data, structured query language (SQL) structures, image data, etc. The example variant-partition link datastore 235 stores information identifying the different variant types that may be stored, and links to corresponding partitions in which data having that variant is stored. FIG. 2A is an example table 280 that may be stored in the example variant-partition link datastore 235 of FIG. 2. The example table 280 the illustrated example of FIG. 2A includes a variant column 281, a partition column 282, and a variant size column 283. In the illustrated example of FIG. 2A, the variant column 281 identifies a given variant. The example partition column 282 identifies a partition in which data for the given variant identified by the variant column 281 is to be stored. The example variant size column 283 identifies an amount of unstructured data that is stored when data is formatted using the variant identified by the variant column 281. The example variant size column 283 identifies size by a number of bytes of data to be stored. However, any other approach to measuring an amount of data may additionally or alternatively be used. While in the illustrated example of FIG. 2A such data is shown as a single table, in some examples such data may be split into multiple tables. For example a first table that identifies the variant and partition links may be used in connection with a second table that identifies the variant and corresponding variant size.

The example table 280 of the illustrated example of FIG. 2A includes a first row 291 that identifies that the first variant (e.g., VARIANT_0) is to be stored in a first partition (e.g., partition 0). The example first row 291 also identifies that the first variant (e.g., VARIANT_0) has a size of two bytes. A second row 292 of the example table 280 of FIG. 2A identifies that the second variant (e.g., VARIANT_1) is to be stored in a second partition (e.g., partition 1). The example second row 292 also identifies that the second variant (e.g., VARIANT_1) has a size of eight bytes. A third row 293 of the example table 280 of FIG. 2A identifies that the third variant (e.g., VARIANT_2) is to be stored in a third partition (e.g., partition 2). The example third row 293 also identifies that the third variant (e.g., VARIANT_2) has a size of thirty two bytes. A fourth row 294 of the example table 280 of FIG. 2A identifies that the fourth variant (e.g., VARIANT_3) is to be stored in a fourth partition (e.g., partition 3). The example fourth row 294 also identifies that the fourth variant (e.g., VARIANT_3) has a size of sixty four bytes. A fifth row 295 of the example table 280 of FIG. 2A identifies that the fifth variant (e.g., VARIANT_4) is to be stored in the fourth partition (e.g., partition 3) (e.g., the same partition as the fourth variant, VARIANT_3). The example fifth row 295 also identifies that the fifth variant (e.g., VARIANT_4) has a size of sixty four bytes. A sixth row 296 of the example table 280 of FIG. 2A identifies that the sixth variant (e.g., VARIANT_5) is to be stored in a fifth partition (e.g., partition 4). The example sixth row 296 also identifies that the sixth variant (e.g., VARIANT_5) has a size of two hundred and fifty six bytes.

Returning to FIG. 2, the example data writer 240 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example data writer 240 of the illustrated example of FIG. 2 writes the data to the selected partition.

In the illustrated example of FIG. 2, the example data reader 245 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example data reader 245 of the illustrated example of FIG. 2, reads data from the partition(s) identified by the example partition manager 230. In some examples, multiple different partitions are to be read by the data reader 245. In such examples, the example data reader 245 aggregates the data before providing a result to the query handler 210 for relay to the query source. In some examples, instead of aggregating the data, the data is sent to the query handler 210 without aggregation.

In the illustrated example of FIG. 2, the example partition creator 250 is implemented by a hardware logic circuit. However, any other type of circuitry may additionally or alternatively be used such as, for example, one or more analog or digital circuit(s), logic circuits, programmable processor(s), ASIC(s), PLD(s), FPLD(s), DSP(s), etc. The example partition creator 250 of the illustrated example of FIG. 2, creates a selected partition at the direction of the partition manager 230. In some examples, the partition creator 250 stores the dimensioning values that were used in connection with the creation of the partition as an index (e.g., the index 263, 265, 267 of FIG. 2) so that the data stored in the partition can be more quickly identified at a later time.

The example database 260 of the illustrated example of FIG. 2 is implemented by any memory, storage device and/or storage disc for storing data such as, for example, flash memory, magnetic media, optical media, etc. Furthermore, the data stored in the example database 260 may be in any data format such as, for example, binary data, comma delimited data, tab delimited data, structured query language (SQL) structures, image data, etc. The example database includes a set of partitions including a first partition 262, a second partition 264, and a third partition 266. Each of the partitions includes a corresponding index. For example, the first partition 262 includes a first index 263, the second partition 264 includes a second index 265, and the third partition 266 includes a third index 267.

While in the illustrated example of FIG. 2 three partitions are shown, any number of partitions may additionally or alternatively be used. Moreover, while in the illustrated example of FIG. 2, the indexes are shown as being included in each of their corresponding partition, in some examples the indexes may be stored separately from the partitions. In the illustrated example of FIG. 2, the partitions are shown as logical components of the same database. Such logical components need not necessarily be stored on the same storage device(s). That is, for example, the first partition 262 may be stored in a first storage device while the second partition 264 is stored in a second storage device separate from the first storage device.

In prior approaches, if a query source (e.g., an application) submitted a query to the database system 201 that would only return data of a particular variant, the example prior database system would either need to have created an index that includes a variant identifier for all indexes that need to be filtered by those values, or the prior database system would scan all data in the database to at runtime to select the appropriate records. Even if an index were used, such data would be stored in an inefficient manner. That is, the unstructured data would be stored in fixed length locations having a length large enough to support the largest variant. Such an approach resulted in large amounts of wasted storage space. By partitioning the unstructured data by variant and/or variant size, example approaches disclosed herein enable data to be physically separated, thereby using the partitions as a first level of filtering (e.g., at the partition file level), and increases data storage efficiency.

Figure 3:
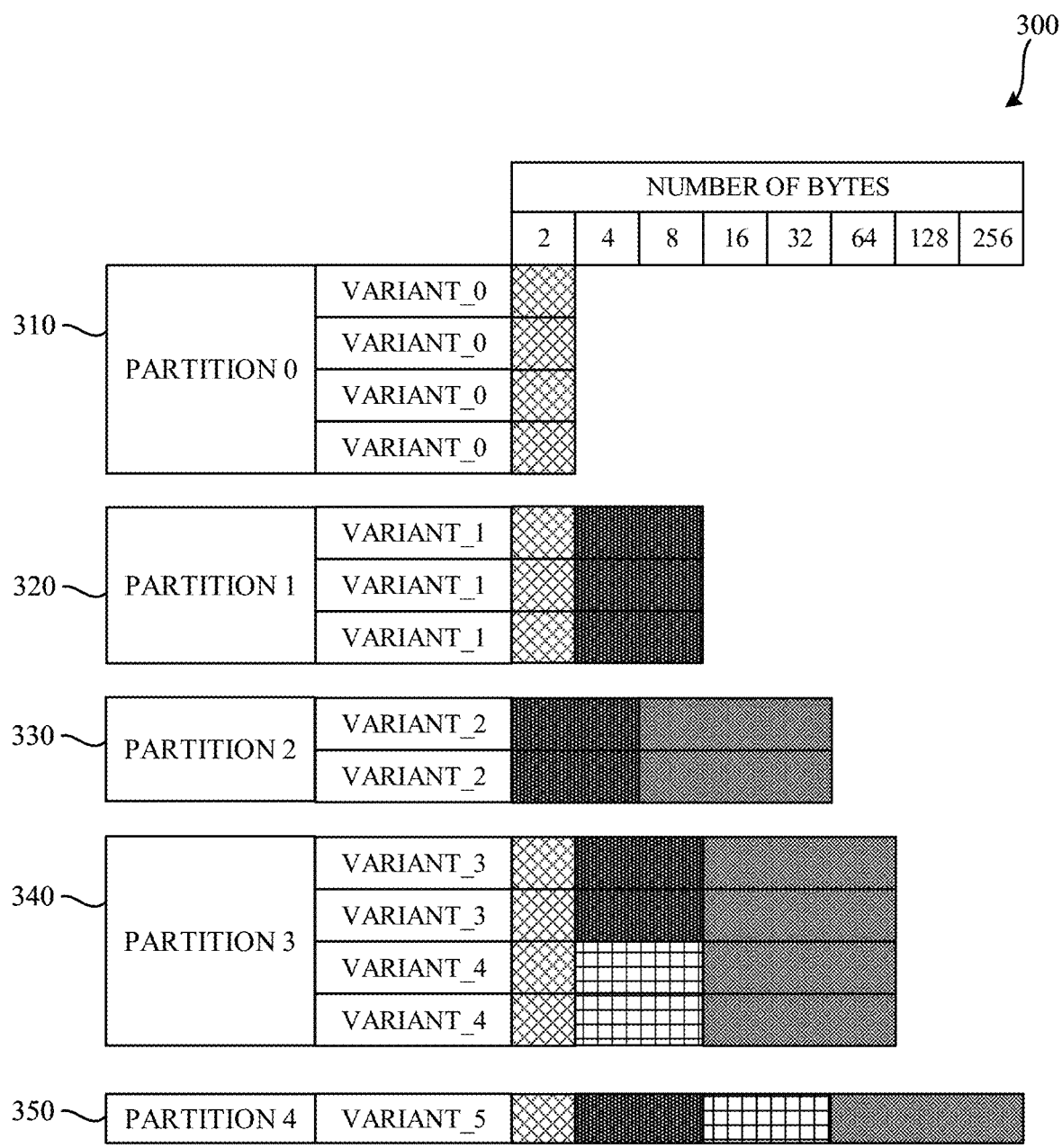
FIG. 3 is a block diagram illustrating an example approach to partitioning data.

FIG. 3 is a block diagram illustrating an example approach 300 to partitioning data using a size of a variant. In the illustrated example of FIG. 3, the stored data is partitioned by the size of the corresponding variant. The example partitioning approach 300 of FIG. 3 results in five partitions 310, 320, 330, 340, 350. A first example partition 310 (e.g., PARTITION 0) corresponds to data having a first variant (e.g., VARIANT_0). Note that the maximum amount of data stored in each of the records of the first partition 310 is two bytes. Thus, the additional two hundred and fifty-four bytes, per record, that was wasted in the illustrated example of FIG. 1 is not wasted in the illustrated example of FIG. 3.

In the illustrated example of FIG. 3, a second example partition 320 (e.g., PARTITION 1) corresponds to data having a second variant (e.g., VARIANT_1). The maximum amount of data stored in each of the records of the second example partition 320 is eight bytes.

In the illustrated example of FIG. 3, a third example partition 330 (e.g., PARTITION 2) corresponds to data having a third variant (e.g., VARIANT_2). The maximum amount of data stored in each of the records of the third example partition 320 is thirty-two bytes.

In the illustrated example of FIG. 3, a fourth example partition 340 (e.g., PARTITION 3) corresponds to data having either a fourth variant (e.g., VARIANT_3) or a fifth variant (e.g., VARIANT_4). The maximum amount of data stored in each of the records of the fourth example partition 340 is sixty-four bytes.

In the illustrated example of FIG. 3, a fifth example partition 350 (e.g., PARTITION 2) corresponds to data having a third variant (e.g., VARIANT_2). The maximum amount of data stored in each of the records of the fifth example partition 350 is two hundred and fifty-six bytes.

In the illustrated example of FIG. 3, the partitions are created based on a size of the corresponding data variant. In some examples, sizes may be rounded, and variants having the same rounded size may be grouped into a same partition. In examples disclosed herein, power of two rounding is used. That is, sizes are rounded up to the nearest power of two (e.g., 2, 4, 8, 16, 32, 64, 128, 256, 512, 1024, etc.). However, any other rounding scheme may additionally or alternatively be used. For example, if data having a seventh variant (e.g., a new variant) having a size of sixty bytes were introduced, such data may be grouped into the fourth partition 340.

In some examples, instead of applying any rounding, variants may be each segmented into their own partitions. In such an example, the fourth example partition 340 of FIG. 3 would be split into two separate partitions, one corresponding to the fourth variant (e.g., VARIANT_3), and another corresponding to the fifth variant (e.g., VARIANT_4).

In the illustrated example of FIG. 3, the partitioning scheme results in physical separation of the data, which acts as a first level filter. Such an approach reduces the need to scan multiple partitions to identify records that are responsive to a query and/or to write data (e.g., some variants may not be responsive to particular requests). In some examples, there are further advantages to this kind of data separation in the context of scaled and clustered environments. For example, within a data cluster, there is a concept of hot data, where portions of data on various nodes are accessed more frequently than others. To eliminate resource hoarding on any given node(s), data is migrated or distributed across the cluster to better utilize all resources. If the data is already naturally segmented according to the variant and/or variant size (or any other value), this migration is trivial and does not require deconstruction and reconstruction of data partitions at a record level to migrate the data. Such data can, therefore, be migrated at a file level (e.g., a partition level) in an efficient manner.

While an example manner of implementing the database management system 201 is illustrated in FIG. 2, one or more of the elements, processes and/or devices illustrated in FIG. 2 may be combined, divided, rearranged, omitted, eliminated and/or implemented in any other way. Further, the example query handler 210, the example variant identifier 220, the example partition manager 230, the example data writer 240, the example data reader 245, the example partition creator 250, the example database 260, and/or, more generally, the example database management system 260 of FIG. 2 may be implemented by hardware, software, firmware and/or any combination of hardware, software and/or firmware. Thus, for example, any of the example query handler 210, the example variant identifier 220, the example partition manager 230, the example data writer 240, the example data reader 245, the example partition creator 250, the example database 260, and/or, more generally, the example database management system 260 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example query handler 210, the example variant identifier 220, the example partition manager 230, the example data writer 240, the example data reader 245, the example partition creator 250, the example database 260, and/or, more generally, the example database management system 260 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example database management system 201 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
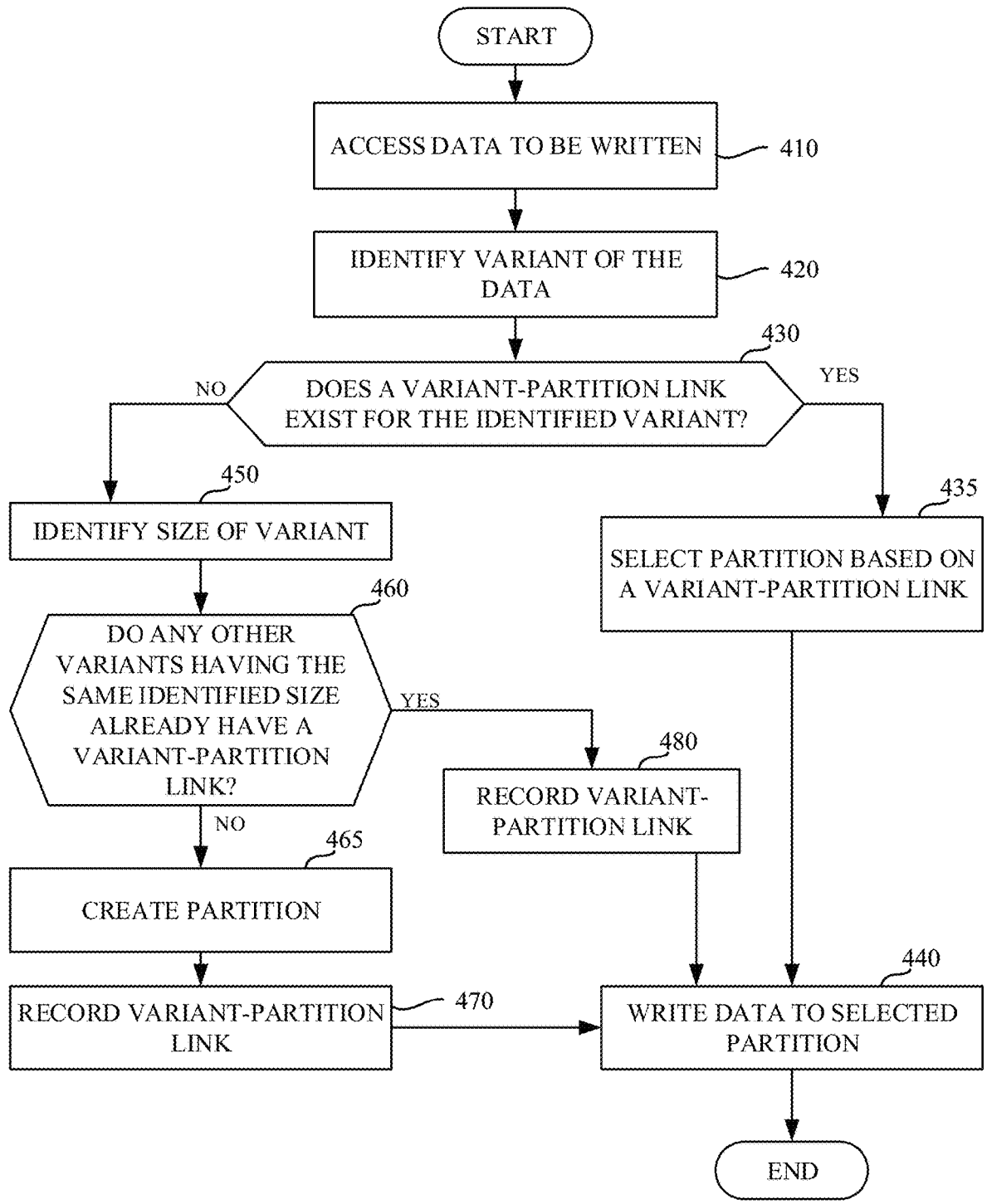
FIG. 4 is a flowchart representative of machine readable instructions which may be executed to implement the example database system of FIG. 2 to write data to a partition.

Flowcharts representative of example hardware logic or machine readable instructions for implementing the example database management system 201 are shown in FIGS. 4 and/or 5. The machine readable instructions may be a program or portion of a program for execution by a processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 4 and/or 5, many other methods of implementing the example database management system 201 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 4 and/or 5 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open-ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open-ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 4 is a flowchart representative of machine readable instructions 400 which may be executed to implement the example database system 201 of FIG. 2 to write data to a partition. The example process 400 of the illustrated example of FIG. 4 begins at block 410 where the example query handler 210 accesses data to be written that is received via a query. (Block 410). In the illustrated example of FIG. 4, the query is a request to write data to the database. In the illustrated example of FIG. 4, the example query handler 210 receives the data to be written via a query from a query source. However, data to be written by me may be received in any other fashion.

The example variant identifier 220 analyzes the data to be written to determine a variant of the data. (Block 420). In examples disclosed herein, the variant identifier 220 identifies the variant by analyzing the data included in the variant. However, in some examples, the variant may be identified to the variant identifier 220 in the data and/or by some other metadata provided in connection with the query. For example, a particular variant may correspond to event notifications coming from a particular query source.

The example partition manager 230 determines whether a variant-partition link exists for the identified variant. (Block 430). The example partition manager 230 determines whether the variant-partition link exists based on variant-partition links stored in the example variant-partition link datastore 235. In the illustrated example of FIG. 4, a single partition is identified. However, in some other examples, data may be received that is to be written to multiple partitions and, as a result, multiple partitions may be identified. For example, a query to write data may include multiple records having different variants.

If a variant-partition link is identified (e.g., block 430 returns a result of YES), the example partition manager 230 selects a partition based on the variant-partition link (block 435), and causes the data writer 240 to write the data to the selected partition. (Block 440). If no variant-partition link is identified (e.g., block 430 returns a result of NO), the example variant identifier 220 identifies the size of the variant. (Block 450). In examples disclosed herein, the example variant identifier counts a number of bytes included in the data, and rounds the number of bytes up to the nearest power of two (e.g., 2 bytes, 4 bytes, 8 bytes, 16 bytes, 32 bytes, etc.). However, any other data size measurement (e.g., bits) may additionally or alternatively be used. Moreover, any other rounding approach may additionally or alternatively be used. In some examples, such rounding is omitted.

The example partition manager 230 then determines whether any other variants having the same size identified by the variant identifier 220 already have a variant-partition link stored in the example variant-partition link data store 235. (Block 460). In some examples, variants having a same size can be grouped together without any reduction in storage efficiency. Using such an approach also serves to reduce the number of partitions, as there is some overhead incurred for creating and indexing new partitions. If no other variant having the same size identified by the variant identifier 220 exists (e.g., block 460 returns a result of NO), the example partition manager 230 instructs the partition creator 250 to create the partition. (Block 465). The example partition manager records a variant-partition link in the example variant-partition link data store 235. (Block 470). The example partition manager 230 then causes the data writer 240 to write the data to the newly created partition. (Block 440).

Returning to block 460, if the example partition manager 230 determines that another variant having the same size identified by the variant identifier 220 is already stored in existing partition, the example partition manager records a variant-partition link in the example partition link data store 235 identifying link between the variant of the received data and the identified partition. (Block 480). The example partition manager 230 then causes the example data writer 240 to write the data into the identified partition. (Block 440). The example process 400 of FIG. 4 then terminates, but may be repeated upon subsequent receipt of a query.

Figure 5:
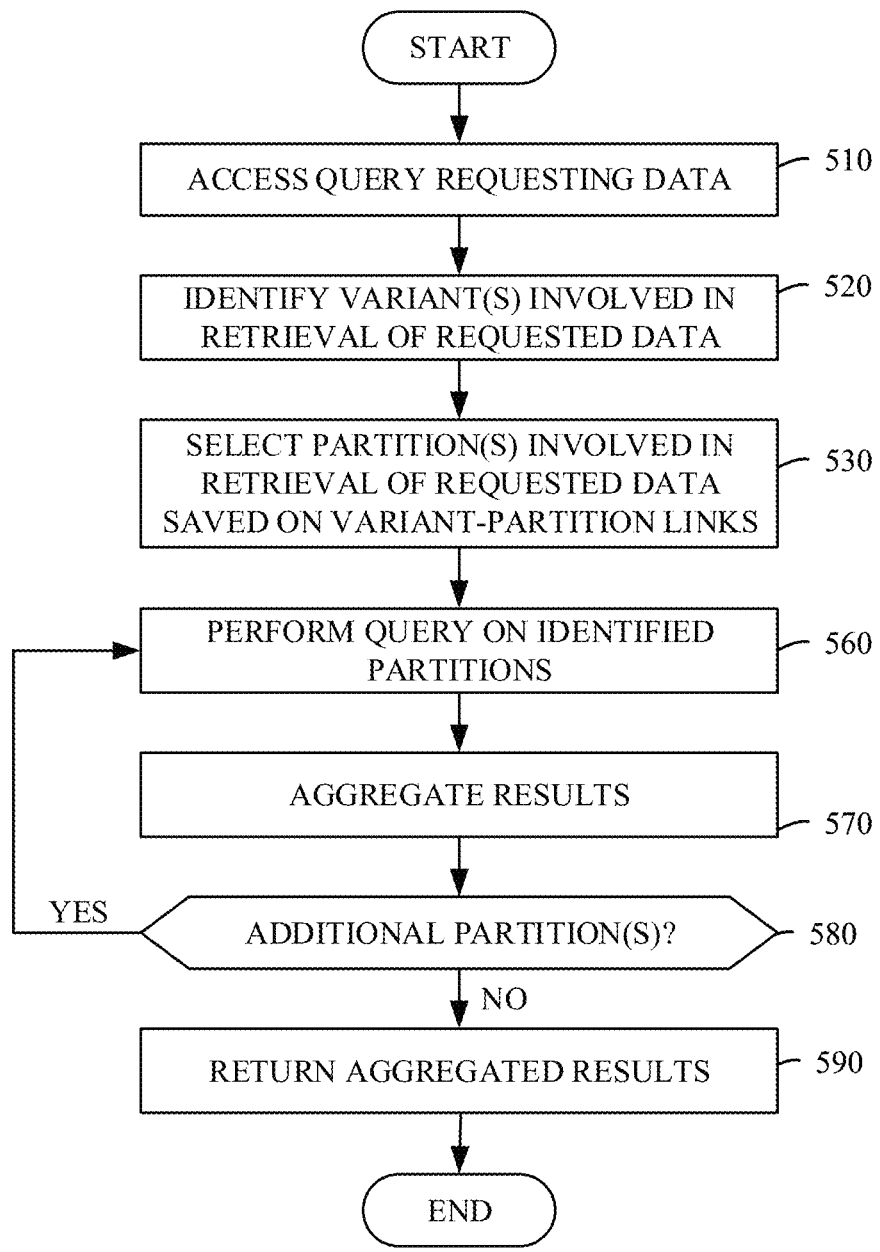
FIG. 5 is a flowchart representative of machine readable instructions which may be executed to implement the example database system of FIG. 2 to read data from a partition.

FIG. 5 is a flowchart representative of machine readable instructions 500 which may be executed to implement the example database system of FIG. 2 to read data from a partition. The example process 500 of the illustrated example of FIG. 5 begins when the example query handler 210 receives a query from a query source. (Block 510). In the illustrated example of FIG. 5 the query is a request to read data from the database. The example variant identifier 220 identifies one or more variants associated with the received query. (Block 520). In examples disclosed herein, the variant identifier 220 identifies the variant based on the contents of the query. However, in some examples, the variant identifier 220 may identify the variant using other metadata supplied in connection with the query such as, for example, a particular field included in the query (which may only appear in particular variants).

In some examples, a particular variant may not be identifiable by the variant identifier 220. For example, a query may be received requesting all data, but is not specific with respect to which variants are to be returned. In such case, the variant identifier 220 may indicate that all variant values are to be returned.

Using the identified variant(s), the example partition manager 230 selects partitions that may store relevant data. (Block 530). In examples disclosed herein, the example partition manager 230 selects the partitions based on the variant-partition links stored in the example variant-partition link datastore 235. In some other examples, the example partition manager 230 scans indexes associated with the partitions to identify relevant partitions (e.g., a partition that is associated with a particular variant). In some examples, a single (e.g., condensed) index may be used by the example partition manager 230 to identify the partitions that may contain data relevant to the query. The example data reader 245 performs the query on an identified partition. (Block 560). The example data reader 245 aggregates the relevant data from the partition. (Block 570).

The example partition manager 230 determines whether any additional partitions might include relevant data. (Block 580). The example process of blocks 560 through 580 is then repeated for the each of those additional partitions, until no additional partitions exist for aggregation of data (e.g., until block 580 returns a result of NO). Once all partitions have been queried (e.g., block 580 returns a result of NO), the example query handler 210 returns the aggregated results to the query source. (Block 590). The example process 500 of the illustrated example of FIG. 5 is then terminated, but may be reperformed in response to a subsequent query being received by the example query handler.

In the illustrated example of FIG. 5, the process of blocks 560 through 580 is illustrated in a serial fashion. That is, each partition that may contain relevant data is sequentially queried and its resultant data is aggregated. However, in some examples, the example process of blocks 560 through 580 may be performed in a parallel fashion. Performing such operations in a parallel fashion reduces the amount of time that may be required to respond to the query.

Figure 6:
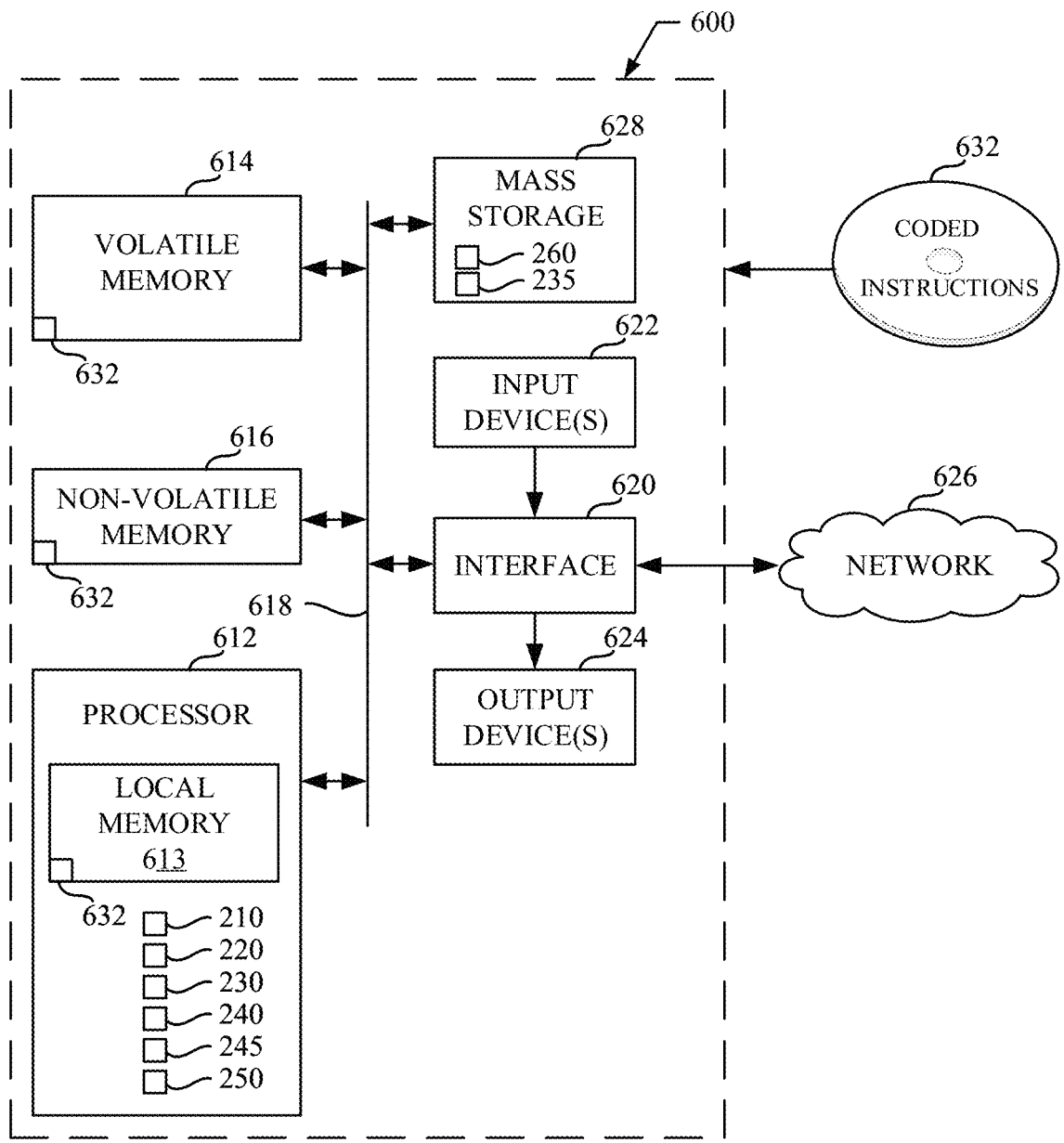
FIG. 6 is a block diagram of an example processing platform structured to execute the instructions of FIGS. 4 and/or 5 to implement the example database system of FIG. 2.

FIG. 6 is a block diagram of an example processor platform 600 structured to execute the instructions of FIGS. 4 and/or 5 to implement the database management system 201 of FIG. 2. The processor platform 1000 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example query handler 210, the example variant identifier 220, the example partition manager 230, the example data writer 240, the example data reader 245, and the example partition creator 250.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-plane switching (IPS) display, a touchscreen, etc.), a tactile output device, a printer and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

In the illustrated example of FIG. 6, the one or more mass storage devices 628 implement the example database 260. While in the illustrated example of FIG. 6, the example database 260 is implemented on a mass storage device of the processor platform 600, in some examples, the example database 260 and/or portions thereof (e.g., one or more partitions) may be implemented by mass storage devices of other processor platforms (e.g., in a distributed and/or clustered environment). In this manner, the processor platform 600 may communicate with such other processor platforms to read and/or write data to those partitions.

The machine executable instructions 632 of FIGS. 4 and/or 5 may be stored in the mass storage device 628, in the volatile memory 614, in the non-volatile memory 616, and/or on a removable non-transitory computer readable storage medium such as a CD or DVD.

From the foregoing, it will be appreciated that example methods, apparatus, and articles of manufacture have been disclosed that enable efficient partitioning of a database that stores unstructured data. By utilizing a size of a variant of the unstructured data to indicate a partition in which such unstructured data should be stored, data can be more efficiently partitioned. For example, fixed record sizes (which must account for the largest variant of unstructured data) can be reduced in certain partitions where the smaller variants are allocated. In some examples, grouping of variants that have similar sizes into a same partition can be used to further reduce overhead associated with creating separate partitions, as wasted space that would otherwise account for larger variants is reduced. Using such partitioning approaches is efficient in terms of resource utilization, as such an approach reduces any overhead (e.g., operational overhead, resource overhead, installation overhead, etc.) associated with maintaining and operating the database system.

Example 1 includes an apparatus to partition a database, the apparatus comprising a variant identifier to identify a variant of unstructured data included in a query, the variant identifier to identify a size of the identified variant, the query including unstructured data to be written to a database, a partition manager to select a partition into which data is to be written based on the size of the identified variant, a partition creator to, in response to the selected partition not existing in the database, create the selected partition, and a data writer to write the data to the selected partition.

Example 2 includes the apparatus of example 1, wherein the variant identifier is to identify the size of the identified variant by rounding a number of bytes of the unstructured data to a next greatest power of two.

Example 3 includes the apparatus of example 1, wherein the partition creator is further to store the variant identifier as an index in association with the selected partition.

Example 4 includes the apparatus of example 1, further including a variant-partition link datastore to store an association between the identified variant and an identifier of the selected partition.

Example 5 includes the apparatus of example 4, wherein the partition creator is to, in response to the selected partition not existing in the database, store a record in the variant-partition link datastore to associate the identified variant with the selected partition.

Example 6 includes the apparatus of example 1, wherein the query is a first query and the variant is a first variant, the variant identifier to identify a second variant requested by a second query, the partition manager to select a partition for reading based on the second variant, and further including a data reader to read the data from the selected partition.

Example 7 includes a non-transitory computer-readable medium comprising instructions that, when executed, cause a machine to at least identify at variant of unstructured data included in a received query, the query including unstructured data to be written to a database, determine a size of the identified variant, select a partition into which data is to be written based on the size of the identified variant, in response to determining that the selected partition does not exist in the database, create the selected partition, and write the data to the selected partition.

Example 8 includes the non-transitory computer-readable medium of example 7, wherein the instructions, when executed, cause the machine to determine the size of the variant identifier by rounding a number of bytes of the unstructured data to a next greatest power of two.

Example 9 includes the non-transitory computer-readable medium of example 7, wherein the instructions, when executed, cause the machine to store the variant identifier as an index in association with the selected partition.

Example 10 includes the non-transitory computer-readable medium of example 7, wherein the instructions, when executed, cause the machine to, in response to the selected partition not existing in the database, store a record in a variant-partition link datastore to associate the identified variant with the selected partition.

Example 11 includes the non-transitory computer-readable medium of example 7, wherein the query is a first query, the variant is a first variant, and the instructions, when executed, further cause the machine to at least identify a second variant requested by a second query, select a partition for reading based on the second variant, and read the data from the selected partition.

Example 12 includes an apparatus to partition a database, the apparatus comprising means for identifying a variant of unstructured data included in a query, the means for identifying to identify a size of the identified variant, the query including unstructured data to be written to a database, means for selecting a partition into which data is to be written based on the size of the identified variant, means for creating the selected partition in response to the selected partition not existing in the database, and means for writing the data to the selected partition.

Example 13 includes the apparatus of example 12, wherein the means for identifying is to identify the size of the identified variant by rounding a number of bytes of the unstructured data to a next greatest power of two.

Example 14 includes the apparatus of example 12, wherein the means for creating is further to store the variant identifier as an index in association with the selected partition.

Example 15 includes the apparatus of example 12, further including means for storing an association between the identified variant and an identifier of the selected partition.

Example 16 includes the apparatus of example 12, wherein the means for creating is to, in response to the selected partition not existing in the database, store a record in the means for storing to associate the identified variant with the selected partition.

Example 17 includes the apparatus of example 12, wherein the query is a first query and the variant is a first variant, the means for identifying is to identify a second variant requested by a second query, the means for selecting is to select a partition for reading based on the second variant, and further including means for reading the data from the selected partition.

Example 18 includes a method of partitioning a database, the method comprising identifying, by executing an instruction with at least one processor, a variant of unstructured data included in a received query, the query including unstructured data to be written to a database, determining, by executing an instruction with the at least one processor, a size of the identified variant, selecting, by executing an instruction with at least one processor, a partition into which data is to be written based on the size of the identified variant, in response to determining that the selected partition does not exist in the database, creating the selected partition, and writing the data to the selected partition.

Example 19 includes the method of example 18, further including determining the size of the variant identifier by rounding a number of bytes of the unstructured data to a next greatest power of two.

Example 20 includes the method of example 18, further including storing a variant identifier as an index in association with the selected partition.

Example 21 includes the method of example 18, further including, in response to the selected partition not existing in the database, storing a record in a variant-partition link datastore to associate the identified variant with the selected partition.

Example 22 includes the method of example 18, wherein the query is a first query, the variant is a first variant, and further including identifying a second variant requested by a second query, selecting a partition for reading based on the second variant, and reading the data from the selected partition.

Although certain example methods, apparatus, and articles of manufacture have been disclosed herein, the scope of coverage of this patent is not limited thereto. On the contrary, this patent covers all methods, apparatus, and articles of manufacture fairly falling within the scope of the claims of this patent.

What is claimed is:

1. An apparatus to partition a database, the apparatus comprising:
   memory; and
   at least one processor to execute instructions that, when executed, cause the processor to:
   in response to a first query being received:
   identify a first variant of first unstructured data included in the first query, the first unstructured data to be written to a database;

identify a first size of the first variant; and
select a first partition into which the first unstructured data is to be written based on the first size of the first variant;
in response to a second query being received:
identify a second variant of second unstructured data included in the second query, the second unstructured data to be written to the database, the second query different from the first query;
identify a second size of the second variant, the second size being different from the first size; and
select a second partition into which the second unstructured data is to be written based on the second size of the second variant;
identify a third variant of third unstructured data included in a third query, the third unstructured data to be written to the database;
identify a third size of the third variant, the third size being the same as the second size;
select the second partition into which the third unstructured data is to be written based on the third size of the third variant;
in response to a determination that at least one of the selected first partition or the selected second partition do not exist in the database, create the at least one of the selected first partition or the selected second partition in the database; and
write the first, second, and third unstructured data to a corresponding one of the created first partition or the created second partition.

2. The apparatus of claim 1, wherein the processor is to identify the size of the first variant by rounding a number of bytes of the first unstructured data to a next greatest power of two.

3. The apparatus of claim 1, wherein the processor is to store a variant identifier as an index in association with the selected first partition.

4. The apparatus of claim 1, wherein the processor is to store an association between the third identified variant and an identifier of the second partition.

5. The apparatus of claim 4, wherein the processor is to, in response to at least one of the selected first partition and the selected second partition not existing in the database, store a record to associate one or more variants with the at least one of the selected first partition and the selected second partition.

6. The apparatus of claim 1, wherein the processor is to:
identify a fourth variant included in a fourth query, the fourth query including a request for the fourth variant;
select a partition for reading based on the fourth variant; and
read data from the selected partition.

7. A non-transitory computer-readable medium comprising instructions that, when executed, cause a machine to at least:
in response to a first query being received:
identify a first variant of first unstructured data included in the first query, the first unstructured data to be written to a database;
identify a first size of the first variant; and
select a first partition into which the first unstructured data is to be written based on the first size of the first variant;
in response to a second query being received:
identify a second variant of second unstructured data included in the second query, the second unstructured data to be written to the database, the second query different from the first query;
identify a second size of the second variant, the second size being different from the first size; and
select a second partition into which the second unstructured data is to be written based on the second size of the second variant;
identify a third variant of third unstructured data included in a third query, the third unstructured data to be written to the database;
identify a third size of the third variant, the third size being the same as the second size;
select the second partition into which the third unstructured data is to be written based on the third size of the third variant;
in response to a determination that at least one of the selected first partition or the selected second partition do not exist in the database, create the at least one of the selected first partition or the selected second partition in the database; and
write the first, second, and third unstructured data to a corresponding one of the created first partition or the created second partition.

8. The non-transitory computer-readable medium of claim 7, wherein the instructions, when executed, cause the machine to determine the size of the first variant by rounding a number of bytes of the first unstructured data to a next greatest power of two.

9. The non-transitory computer-readable medium of claim 7, wherein the instructions, when executed, cause the machine to store a variant identifier as an index in association with the selected first partition.

10. The non-transitory computer-readable medium of claim 7, wherein the instructions, when executed, cause the machine to, in response to at least one of the selected first partition and the selected second partition not existing in the database, store a record to associate one or more variants with the at least one of the selected first partition and the selected second partition.

11. The non-transitory computer-readable medium of claim 7, the instructions, when executed, further cause the machine to at least:
identify a fourth variant requested by a fourth query;
select a partition for reading based on the fourth variant; and
read data from the selected partition.

12. An apparatus to partition a database, the apparatus comprising:
means for identifying to, in response to a first query being received, identify a first variant of first unstructured data included in the first query, the first unstructured data to be written to a database;
means for identifying to, in response to the first query being received, identify a first size of the first variant;
means for selecting to, in response to the first query being received, select a first partition into which the first unstructured data is to be written based on the first size of the first variant;
means for identifying to, in response to a second query being received, identify a second variant of second unstructured data included in the second query, the second unstructured data to be written to a database, the second query different from the first query;
means for identifying to, in response to the second query being received, identify a second size of the second variant, the second size being different from the first size;

means for selecting to, in response to the second query being received, select a second partition into which the second unstructured data is to be written based on the second size of the second variant;

means for identifying a third variant of third unstructured data included in a third query, the third unstructured data to be written to a database;

means for identifying a third size of the third variant, the third size being the same as the second size;

means for selecting the second partition into which the third unstructured data is to be written based on the third size of the third variant;

means for creating the at least one of the selected first partition or the selected second partition in the database in response to at least one of the selected first partition or the selected second partition not existing in the database; and means for writing the first, second, and third unstructured data to a corresponding one of the first created partition or the second created partition.

13. The apparatus of claim 12, further including means for identifying to identify a size of the first variant by rounding a number of bytes of the first unstructured data to a next greatest power of two.

14. The apparatus of claim 12, wherein the means for creating is further to store a variant identifier as an index in association with the selected first partition.

15. The apparatus of claim 12, further including means for storing an association between the third identified variant and an identifier of the second partition.

16. The apparatus of claim 12, wherein the means for creating is to, in response to at least one of the selected first and second partitions not existing in the database, store a record in the database to associate identified one or more variants with the selected first and second partitions.

17. The apparatus of claim 12, further including:
means for identifying a fourth variant included in a fourth query, the fourth query including a request for the fourth variant;
means for selecting a partition for reading based on the fourth variant; and
means for reading data from the selected partition.

* * * * *